United States Patent [19]

Walsh et al.

[11] Patent Number: 4,575,802
[45] Date of Patent: Mar. 11, 1986

[54] ROBOT/WORKPIECE ORIENTATION

[75] Inventors: Peter M. Walsh, So. Windsor; Stephen M. Gardner, Enfield, both of Conn.

[73] Assignee: United Technologies Corporation, Hartford, Conn.

[21] Appl. No.: 512,828

[22] Filed: Jul. 11, 1983

[51] Int. Cl.[4] ............................................. G06F 15/46
[52] U.S. Cl. ..................... 364/513; 364/167; 364/191; 364/571; 318/632; 901/3; 901/33; 901/35; 901/47
[58] Field of Search .............. 364/513, 167, 191, 192, 364/193, 571; 318/568, 632; 901/2, 3, 5, 6, 8-10, 14, 16, 30, 33, 35, 46, 47

[56] References Cited

U.S. PATENT DOCUMENTS

| | | | |
|---|---|---|---|
| 3,920,972 | 11/1975 | Corwin, Jr. et al. | 364/513 |
| 4,338,672 | 7/1982 | Perzley et al. | 364/513 |
| 4,362,977 | 12/1982 | Evans et al. | 901/9 X |
| 4,382,215 | 5/1983 | Barlow et al. | 318/568 |
| 4,429,266 | 1/1984 | Tradt | 318/568 |
| 4,453,085 | 6/1984 | Pryor | 901/47 X |
| 4,481,592 | 11/1984 | Jacobs et al. | 364/513 |

OTHER PUBLICATIONS

"An Off-line Programming Approach", R. L. Tarvin, Robotics Today, Summer 1981, pp. 30-35.
"Robotic Drilling and Riveting Using Computer Vision", R. C. Movich, Robots V Conference, Oct. 1980.

Primary Examiner—Jerry Smith
Assistant Examiner—John R. Lastova
Attorney, Agent, or Firm—Gerald E. Linden

[57] ABSTRACT

A robot "touches off" on the orthagonal touchblock faces of a workpiece holding fixture and the coordinate of the touches along axes nominally normal to the faces provide significant data from which a coordinate transformation indicative of the orientation and location of the touchblocks in the robot frame of reference can be determined. The coordinate transformation is subsequently applied to workpiece coordinates indicative of the location and orientation of the workpiece and/or points thereon.

1 Claim, 1 Drawing Figure

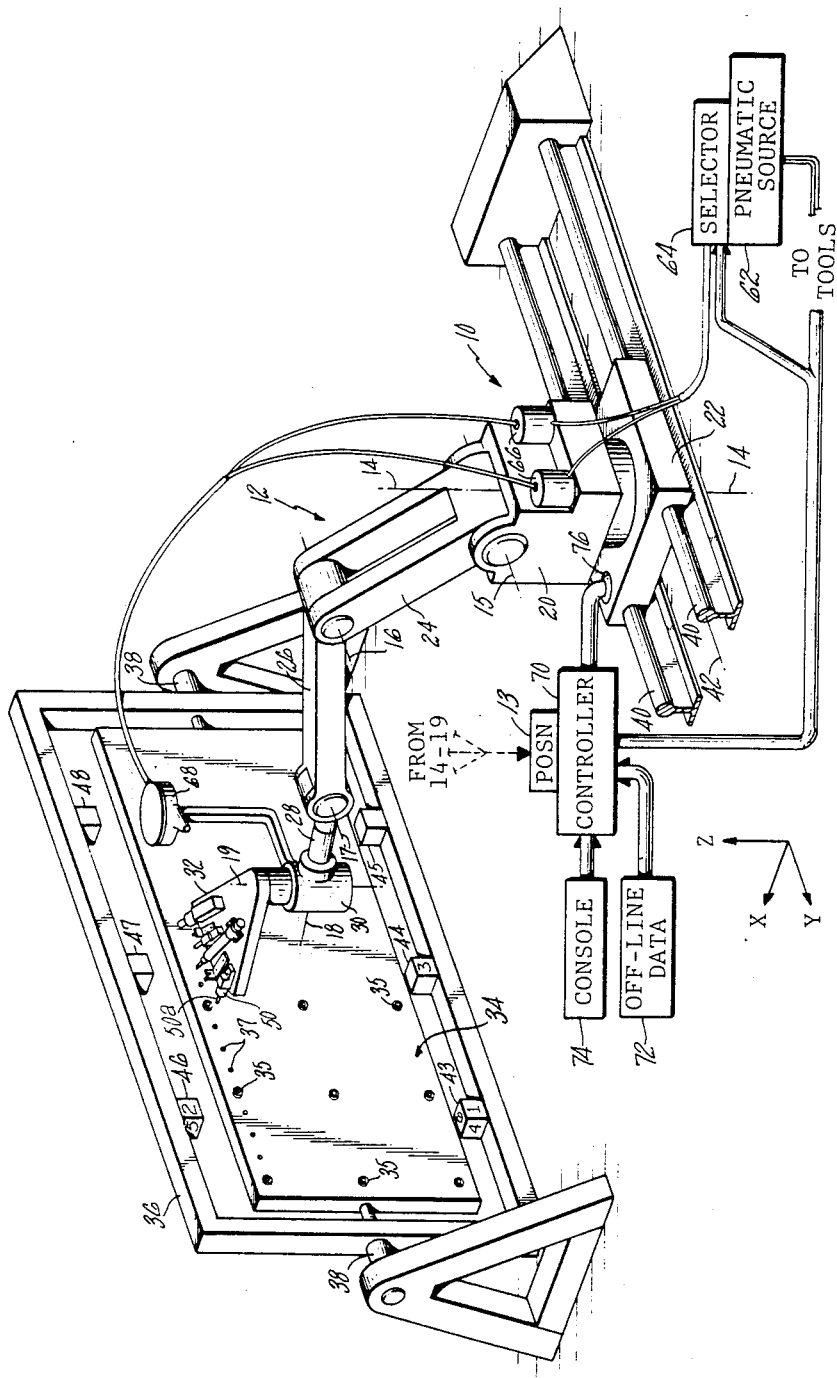

ROBOT/WORKPIECE ORIENTATION

TECHNICAL FIELD

This invention relates to robotics, and more particularly, to providing for alignment of a robot with a workpiece.

BACKGROUND ART

Reference is made herein to copending, commonly owned U.S. Ser. No. 512,829 entitled OFF-LINE PROGRAMMABLE ROBOT. As discussed therein, in the context of an articulated robot, maintaining an identifiable relationship between the robot and the workpiece is nigh unto impossible. This is especially true when the robot is mounted to a track to extend its work envelope. Therefore, it is desirable to implement a scheme whereby the positional relationship between the robot and the workpiece is easily identifiable each time the robot moves to a new work station.

A scheme for determining the positional relationship between the robot and the workpiece involves manually directing an end effector (pointer) to four precise points on the workpiece, or on a fixture that holds the workpiece, and collecting coordinate data in three dimensions at each of the four points on the workpiece to generate an offset vector (L), representative of the robot coordinates of a workpiece zero-point and a three-by-three matrix that accounts for the rotation between the two frames of reference (See *Robotics Today*, Summer 1981, ppgs. 30–35, Tarvin, Ronald L., "An Off Line Programming Approach"). A disadvantage of this approach is a high degree of operator interaction which can be extremely time consuming. Furthermore, the collection of three "good" datum at each reference point requires a high degree of accuracy in many robotic axes, simultaneously.

DISCLOSURE OF INVENTION

Therefore it is an object of this invention to provide for an automatic (i.e., robot controlled) determination of the orientation of a workpiece (and/or points thereon) relative to a robot. It is a further object to make the determination based on a minimum amount of significant data.

According to the invention, a workpiece is mounted in a known, precise manner to a fixture upon which are disposed touchblocks, such as cubes. Based on nominal touchblock location data, the robot "touches-off" on a total of six faces of three blocks and takes measurements. Only the coordinate along an axis normal to the touched face is considered significant data while the position of the touch on the face is not significant. Vectors are constructed from the coordinates of the touch points and are then manipulated (by cross product) to cancel out the insignificant data and construct rectilinear unit vectors for a touchblock frame of reference in the robot frame of reference. Three of the total of six touches are orthogonal touches on 3 faces of one block, which provides significant data to determine the offset of the touchblock coordinate system zero point from the robot frame of reference zero point. The offset and rectilinear unit vectors are used in a known manner to determine a coordinate transformation between the robot frame of reference and the touchblock (workpiece) frame of reference. Thus, relative position and orientation of robot and workpiece are established for subsequent application to nominal workpiece coordinates to insure accuracy when the robot performs operations on the workpiece.

The foregoing and other objects, features and advantages of the present invention will become more apparent in the light of the following detailed description of an exemplary embodiment thereof.

BRIEF DESCRIPTION OF DRAWINGS

The sole FIGURE is a perspective view of the robot and associated workpiece and fixture for practicing this invention.

DETAILED DESCRIPTION OF THE INVENTION

In the sole FIGURE is shown a robot 10 that is controlled by a controller 70 and that has an articulated arm 12 terminating in a toolplate 32 upon which is disposed an end effector, such as a touch probe (sensor) 50. The probe 50, which may be a Renishaw probe, is operable to provide a signal to the controller 70 whenever a pointer 50a comes into contact with an object, i.e. is displaced. The robot 10 is movable on a track 40 and a workpiece 34 is mounted to the fixture 36 in a predetermined manner and the fixture 36 is disposed to locate the workpiece 34 within the robot's work envelope.

Touchblocks 43–48 are mounted to the fixture in a predetermined manner. The touchblocks are each similarly oriented and, for purposes of this description, the touchblocks 43–48 are cubes. A nominal touchblock frame of reference is defined by three orthogonal unit vectors x, y, z that are normal to the faces of the touchblocks. The touchblock frame of reference unit vectors x, y, z substantially coincide with a robot frame of reference x, y, and z axes.

Positioning a fixture and associated workpiece fairly accurately relative to a robot is a well-established procedure. Therefore, both touchblock and workpiece orientation and location are fairly accurately in robot coordinates known. In practice, greater accuracy may be required. However, as will be apparent, the deviation must not be large, i.e., the touchblock faces must actually be substantially normal to the x, y, and z axes. Therefore, it is essential to determine the actual location and orientation of the touchblocks relative to the robot. This is accomplished, generally, by identifying the three orthogonal unit vectors x, y, z that define the touchblock frame of reference in robot coordinates. Thereby, a coordinate transformation indicative of the position and orientation of the touchblocks in the robot frame of reference is determined and subsequently applied to off-line data (nominal workpiece coordinates) specifying the location and orientation of the workpiece and/or points located thereon.

A workstation is defined by the position of the robot 10 along the track 40. Sets of touchblocks, for example the touchblocks 43, 44, 46 and 47, correspond to each workstation. Off-line data 72, indicative of the predicted locations of the touchblocks is stored in the controller 70. More specifically, this data may be coordinates for features, such as the centerpoints, of faces of the touchblocks.

To identify the three touchblock unit vectors x, y, z, the controller positions (moves) the arm 12 in response to the stored touchblock coordinates to cause the touchprobe 50 to contact faces of the touchblocks. Robot coordinate data for each touch is provided to the controller 70 by a position sensor 13. The sensor 13 may be resolvers responsive to arm movement at each axis 14–19. In actual operation, the probe 50 may be moved quickly, in gross increments, to contact the block faces, and then backed off with high resolution increments—the position measurement being taken when the probe 50 loses contact with the touchblock face—hence, the concept of "touching off."

The controller 70 commands the probe 50 to move and touch off at a point P1 on a face 1 of the touchblock 43 in response to the stored touchblock coordinates for the centerpoint of the face 1. It is an important feature of this invention that the actual touch point P1 may not turn out to be the centerpoint of the face 1. Since the face 1 is substantially normal to robot x-axis, the robot x-axis coordinate for the touch will not vary significantly with the y-axis and z-axis displacement for the touch, so long as contact is made with the face 1. Therefore, one "significant" datum, namely the robot x-axis coordinate for the point P1 is measured by the position sensor 13 and stored in the controller 70. The y-axis and z-axis coordinates are not significant and may be assigned an arbitrary value. The non-significant coordinates are also stored in the controller 70. The broad concept of gathering only one significant datum per touch, in the context of not having to accurately position the probe 50 at a predetermined point to gather significant coordinate data in three dimensions (x, y, z) simultaneously, is applicable to subsequent touches.

A face 2 of the touchblock 46 is coplanar with the face of the touchblock 43, and is therefore oriented substantially normal to the robot x-axis. In a manner similar to the touch on the face 1, the controller 70 commands the probe 50 to "touch-off" at a point P2 on the face 2 in response to the nominal touchblock coordinates. The x-axis coordinate for the point P1 is measured by the sensor 13 and stored in the controller 70. Again only the x-axis coordinate is significant. The y and z-axis coordinates of the point P2 may be assigned arbitrarily, as for the point P1.

A face 3 of the touchblock 44 is coplanar with the face 1 of the touchblock 43 and the face 2 of the touchblock 46, and is therefore oriented substantially normal to the robot x-axis. In the aforementioned manner, the robot "touches-off" at a point P3 on the face 3 and the significant x-axis coordinate for the Point P3 is stored in the controller 70.

A vector $V_{1,3}$ is determined by the points P1 and P3. The crossproduct of the vectors $V_{1,2}$ and $V_{1,3}$, when divided by its magnitude, provides the first unit vector (x) for the touchblock frame of reference in robot coordinates, and is stored in the controller. The crossproduct operation is sensitive only to the significant (x-axis) data, in other words, the orientation of the first unit vector is determined solely by the x-axis coordinates of the coplanar faces 1, 2, and 3. (The faces 1, 2 and 3 are coplanar in the sense of their orientation. An x-axis offset between them will not disturb the practice of this invention, so long as the offset is known and accounted for. However, one face must not be skewed.)

In a manner similar to that already described, the controller 70 moves the probe 50 to contact the touchblock 43 at a point P4 on a face 4 and to contact the touchblock 46 at a point P5 on coplanar face 5. The movement is in response to the stored touchblock coordinates and, as in the x-axis touches, it is a single datum, herein the y-axis coordinate for each point, that is considered significant. The faces 4 and 5 are substantially normal to the robot y-axis so that the y-axis coordinate, anywhere on those faces, is independent of x-axis and z-axis inaccuracies. Again, while coplanar, the faces 4 and 5 may be offset along the y-axis so long as the offset is known. A vector $V_{4,5}$ is determined by the point P4 and the point P5. The second unit vector (y) for the touchblock frame of reference in robot coordinates is determined by taking the cross product of the first unit vector (x) in robot coordinates and the vector $V_{4,5}$ and is stored in the controller 70. Since the second unit vector corresponds to the y-axis, it is important that the face 5 be offset in the z-axis from the face 4, else the vector $V_{4,5}$ may degenerate.

As a matter of good practice, the x-axis stored coordinates for the touchblock the faces 4 and 5 (and 6, as will be evident) can be updated by the measurements taken by the touches on the faces 1, 2, and 3 prior to the touchoffs on the faces 4 and 5.

Having thus determined the first (x) and second (y) unit vectors for the touchblock frame of reference, the third unit vector (2) is determined simply by taking the crossproduct for the first and second unit vectors. This provides all the necessary data to determine a rotation matrix indicative of the rotation of the actual touchblock frame of reference relative to the robot frame of reference. An offset need yet to be determined to define the coordinate transformation between the two frames of reference. Therefore, the controller 70 commands the robot 10 to move the probe 50 to contact the touchblock 43 at a point P6 on a face 6, substantially normal to the robot z-axis. The movement is in response to the stored touchblock coordinates and, as in previous touches, it is a single datum, herein the robot z-axis coordinate for the touch, that is considered significant. The z-axis coordinate of the sixth touch, in conjunction with a significant x-axis coordinate (e.g., of the point P1) and a significant y-axis coordinate (e.g., of the point 4), provides sufficient data to determine a reference point, such as to a corner of the touchblock 43. The reference point may, in fact, be the zero point for the touchblock frame of reference. An offset vector determined by the reference point and a robot frame of reference zero point is indicative of the offset between the actual touchblock frame of reference and the robot frame of reference. The offset vector and rotation matrix provide for determination of a coordinate transformation that is subsequently applied to stored workpiece coordinate data in the controller 70 which defines the location and orientation of the workpiece and/or points thereon. This enables the robot to perform machine operations accurately at locations on a workpiece, such as described in commonly-owned, copending U.S. Ser. No. 512,829 entitled OFF-LINE PROGRAMMABLE ROBOT, and filed on even date herewith.

Under the present scheme, the robot is able to determine the touchblock, and hence the workpiece orientation at various work stations by touching off on only 3 blocks, although there are typically four blocks available for touching off. The system may be configured so as to be insensitive to whichever leg is missing when touching off on only three blocks. The goal of course is to perform the minimum amount of steps while achieving the highest degree of accuracy. The invention provides for quick and accurate determination of the orientation and location of a workpiece relative to a robot (or for correction of workpiece coordinates specifying preselected locations on the workpiece). Inherent robot inaccuracies are minimized as the limiting factor in making that determination, since only significant data is used. By maintaining accuracy in only one axis at a time, accuracy can be maintained with comparative ease when contrasted with collecting three good datum for each touch. Furthermore, the lack of a requirement to locate precisely defined points on the fixture facilitates the overall process.

It should be understood that any combination of three touchblocks can be touched at a particular workstation although more may be provided and that the touch order is not significant. It should also be understood that various combinations of faces may be touched so long as there are three touches along a first axis (e.g., three x-axis touches on the faces 1,2,3), two touches along a second axis (e.g., two y-axis touches on the faces 4,5), and one touch along a third axis (e.g., the z-axis touch on the face 6); and that there are three touches, one for each axis, on one of the blocks. It should also be understood that a touchblock may comprise a number of faces which may not actually be embodied in a single block, but which are in fixed positional relationship to each other, and to the x, y, and z axes as described herein.

It should be understood that the points P1–P6 are distinct and that the non-significant coordinates for a point must be determined such that vectors do not degenerate, such as by being colinear.

The invention has been described in terms of functional steps. The actual detailed implementation in a controlled robot will vary from system to system, but is nevertheless straightforward and capable of being practiced with a variety of software and computer architectures.

Thus, although the invention has been shown and described with respect to an exemplary embodiment thereof, it should be understood by those skilled in the art that the foregoing and various other changes, omissions and additions may be made therein and thereto without departing from the spirit and the scope of the invention.

What is claimed is:

1. A method of determining a coordinate transformation indicative of the rotation and origin offset of a touchblock frame of reference from a robot frame of reference, wherein the touchblock frame of reference is associated with a workpiece mounted to a fixture and is defined by three orthogonal unit vectors (x,y, and z), and wherein the robot frame of reference is associated with a robot and has three orthogonal axes—an x-axis, a y-axis, and a z-axis, comprising:

providing a first touchblock (43) on the fixture having a first face (1) substantially normal to the robot x-axis, a second face (4) substantially normal to the robot y-axis, and a third face (6) substantially normal to the robot z-axis;

providing a second touchblock (46) on the fixture having a fourth face (2) coplanar to the first face (1), and a fifth face (5) coplanar to the second face (4);

providing a third touchblock (44) on the fixture having a sixth face (3) coplanar to the first (1) and fourth (2) faces;

storing nominal coordinates in the robot frame of reference for the six faces (1–6) indicative of the approximate location of the fixture relative to the robot;

automatically positioning the touchprobe in response to the stored nominal coordinates for the first face (1) to measure the actual location of the first face in the robot frame of reference, and storing a measured x-axis coordinate for the measured location of the first face;

automatically positioning the touchprobe in response to the stored nominal coordinates for the fourth face (2) to measure the actual location of the fourth face in the robot frame of reference, and storing a measured x-axis coordinate for the measured location of the fourth face;

automatically positioning the touchprobe in response to the stored nominal coordinates for the sixth face (3) to measure the actual location of the sixth face in the robot frame of reference, and storing a measured x-axis coordinate for the measured location of the sixth face;

automatically positioning the touchprobe in response to the stored nominal coordinates for the second face (4) to measure the actual location of the second face in the robot frame of reference, and storing a measured y-axis coordinate for the measured location of the second face;

automatically positioning the touchprobe in response to the stored nominal coordinates for the fifth face (5) to measure the actual location of the fifth face in the robot frame of reference, and storing a measured y-axis coordinate for the measured location of the fifth face;

automatically positioning the touchprobe in response to the stored nominal coordinates for the third face (6) to measure the actual location of the third face in the robot frame of reference, and storing a measured z-axis coordinate for the measured location of the third face;

calculating a first vector ($V_{1,2}$) based on the measured x-axis coordinates for the measured location of the first (1) and fourth (2) faces;

calculating a second vector ($V_{1,3}$) based on the measured x-axis coordinates for the measured location of the first (1) and sixth (3) faces;

calculating the x unit vector for the touchblock frame of reference by taking the crossproduct of the first and second vectors;

calculating a third vector ($V_{4,5}$) based on the measured y-axis coordinates for the measured location of the second (4) and fifth (5) faces;

calculating the y unit vector for the touchblock frame of reference by taking the crossproduct of the calculated x unit vector and the third vector;

calculating the z unit vector for the touchblock frame of reference by taking the crossproduct of the calculated x unit vector and the calculated y unit vector;

determining a rotation matrix indicative of the rotation of the touchblock frame of reference relative to the robot frame of reference based on the calculated x, y, and z unit vectors for the touchblock frame of reference;

determining an offset vector indicative of the offset of origins between the touchblock frame of reference and the robot frame of reference based on the measured x-axis coordinate of the first face, the measured y-axis coordinate for the second face, and the measured z-axis coordinate for the third face; and determining the coordinate transformation based on the rotation matrix and the offset vector.

* * * * *